US006809127B2

(12) United States Patent
Dones et al.

(10) Patent No.: US 6,809,127 B2
(45) Date of Patent: Oct. 26, 2004

(54) RADIATION CURABLE COMPOSITIONS WITH ENHANCED ADHESION

(75) Inventors: Miguel A. Dones, Hatfield, PA (US); Anbazhagan Natesh, North Wales, PA (US); Daniel Haile, Perkiomenville, PA (US); Ramesh L. Narayan, Harleysville, PA (US)

(73) Assignee: Cognis Corporation, Cincinnati, OH (US)

( * ) Notice: Subject to any disclaimer, the term of this patent is extended or adjusted under 35 U.S.C. 154(b) by 66 days.

(21) Appl. No.: 10/243,013

(22) Filed: Sep. 13, 2002

(65) Prior Publication Data

US 2003/0073756 A1 Apr. 17, 2003

Related U.S. Application Data

(60) Provisional application No. 60/326,978, filed on Oct. 4, 2001.

(51) Int. Cl.$^7$ ............................ C08F 2/46; B32B 15/08; C08G 69/29
(52) U.S. Cl. .................. 522/176; 522/173; 522/182; 522/150; 522/152; 522/153; 528/332; 528/335; 528/345; 528/342; 528/350
(58) Field of Search ................. 528/332, 335, 528/342, 345, 350; 428/435, 458, 474.4; 522/173, 176, 182, 150, 152, 153

(56) References Cited

U.S. PATENT DOCUMENTS

| 4,141,867 A | 2/1979 | Fuchs et al. |
| 4,987,160 A | 1/1991 | Frihart et al. |
| 5,019,608 A | 5/1991 | Shah |
| 5,180,792 A | 1/1993 | Takada et al. |
| 5,804,671 A | 9/1998 | Dones et al. |
| 5,889,076 A | 3/1999 | Dones et al. |

FOREIGN PATENT DOCUMENTS

| DE | 26 36 970 A1 | 2/1978 |
| DE | 41 30 834 A1 | 3/1993 |
| DE | 41 34 081 A1 | 4/1993 |

*Primary Examiner*—James J. Seidleck
*Assistant Examiner*—Sanza L. McClendon
(74) *Attorney, Agent, or Firm*—Aaron R. Ettelman; Steven J. Trzaska; Daniel S. Ortiz

(57) ABSTRACT

A radiation-curable composition is comprised of the reaction product of an amine-terminated (poly)aminoamide and a mono-(meth)acrylate or a poly-(meth)acrylate. The radiation-curable composition is a liquid at room temperature and does not undergo substantial volume contraction upon curing and exhibit excellent adhesion to porous and non porous substrates alike.

15 Claims, No Drawings

RADIATION CURABLE COMPOSITIONS WITH ENHANCED ADHESION

CROSS-REFERENCE TO RELATED APPLICATIONS

This application claims the benefit of copending provisional application Ser. No. 60/326,978, filed on Oct. 4, 2001, the entire contents of which are incorporated herein by reference.

BACKGROUND OF THE INVENTION

Use of Ultra-Violet/Electron Beam curable compositions in the coatings and inks industries has been growing tremendously in the last few years due to their ability to cure instantaneously with optimal film properties such as chemical, stain and abrasion resistance. Since vinyl polymerization occurs with substantial volume contraction, adhesion of radiation curable compositions to non porous substrates, such as glass, plastics and metals, and porous substrates, such as wood, paper and leather, remains a challenging problem to formulators.

BRIEF SUMMARY OF THE INVENTION

The present invention relates to a radiation-curable composition comprising the reaction product of an amine-terminated (poly)aminoamide and a mono-(meth)acrylate or a poly-(meth)acrylate. The compositions according to the invention are liquids at room temperature. The invention also pertains to a method of producing a coated substrate comprising contacting a substrate with the composition according to the invention and subjecting the composition to high energy electrons or ultraviolet light. The compositions according to the invention can also be cured via thermal polymerization using well known free radical initiators such as organic peroxides.

Radiation cured compositions according to the invention deposited on a substrate exhibit excellent adhesion characteristics to the substrate.

DETAILED DESCRIPTION OF THE INVENTION

The term (meth)acrylate means a mono-acrylate or a methacrylate ester. The term poly-(meth)acrylate means a compound having two or more acrylate or methacrylate ester groups. The term (poly)aminoamide includes a mono-aminoamide or a polyaminoamide.

The amine-terminated (poly)aminoamide s according to the invention can be made by the reaction between a di- or poly basic carboxylic acids and excess polyfunctional amines to produce amine-terminated (poly)aminoamides. The acids can be saturated, unsaturated fatty acids or a combination thereof and/or its dimers of unsaturated fatty acids such as a $C_{38}$ dimer acid. The polyfunctional amines can be linear polyalkylene polyamine examples of which include, but are not limited to, ethylene diamine, 1,6-hexamethylene diamine, trimethylpentanediamine, diethylene triamine, triethylene tetramine, tetraethylene tetraamine; cyclic polyamines such as piperazine, isophorone diamine, meta-xylene diamine, norbornane diamine, 1,3-diaminomethyl cyclohexane and polyether based polyamines available commercially as JEFFAMINE® D-230, T-403 and D-2000.

The (meth)acrylates according to the invention can be any di- or polyfunctional (meth)acrylates. Such compounds include compounds having both acrylate and methacrylate groups. Examples of the (meth)acrylates according to the invention include, but are not limited to, (a) the reaction product of the diglycidyl ethers of aliphatic diols and (meth)acrylate acid such as butanedioldiglycidyl ether and (meth)acrylate acid, the mono-glycidyl ether of (meth)acrylate acid and (meth)acrylate acid; a mixed acrylate-methacrylate ester of butanedioldiglycidyl ether; (b) (meth)acrylate-terminated urethanes made by the reaction of a diisocyanate and 2-hydroxyethyl (meth)acrylate, of a diisocyanate and the reaction product of succinic anhydride and (meth)acrylate acid.

The ratio of (meth)acrylate to amine-terminated (poly)aminoamide can vary from about 100 to about 1 (meth)acrylate equivalence to amine hydrogen equivalence, preferably from about 15 to about 1 and most preferably about 8 to about 1 ratio in terms of (meth)acrylate to amine hydrogen equivalence.

The compositions according to the invention can optionally contain acid functional (meth)acrylates. The acid functional (meth)acrylate according to the invention can be made by the reaction between dicarboxylic acid anhydrides and hydroxyalkyl (meth)acrylates. Examples of anhydrides that can be used include, but are not limited to, succinic anhydride, maleic anhydride, alkenyl succinic anhydrides such as dodecenyl succinic anhydride and octenyl succinic anhydride, trimellitic and phthalic anhydrides. Examples of hydroxyalkyl (meth)acrylates includes hydroxyethyl acrylate and methacrylate, hydroxypropyl acrylate and methacrylate, hydroxybutyl acrylate and methacrylate and caprolactone or polycaprolactone esterified with above hydroxyalkyl acrylate and methacrylates.

The compositions according to the invention can optionally contain photoinitiators such as benzophenone, $\alpha,\alpha$-dimethoxy-$\alpha$-phenylacetophenone, $\alpha,\alpha$-diethoxyacetophenone and alkyl benzoin ethers.

The compositions according to the invention can be applied to any type of substrate such as, for example, non porous substrates, such as glass, plastics and metals, and porous substrates, such as wood, paper and leather by any means known to those skilled in the art such as by spraying, dipping, brushing, etc. The compositions according to the invention can be cured by any type of radiation that is typically used such as high energy electrons (electron beams) and ultraviolet light. The compositions according to the invention can also be cured thermally in the presence of a free radical initiator such as benzoyl peroxide or azo-bisisobutyronitrile.

EXAMPLE 1

In a clean container weigh 61.0 parts (0.4066 equiv.) of tripropylene glycol diacrylate with an acrylate equivalent weight of 150 and add 7 parts (0.0722 equiv.) of VERSAMID® 140 (polyaminoamide based on Tallow oil fatty acid and its dimer polymer with triethylene tetramine) with an amine hydrogen equivalent of 97, with stirring. The resulting product mixture is added with 14 parts of mono[2-[(1-oxo-2-propenyl)oxy]ethyl]ester of butanedioic acid (made by addition reaction of one mole of succinic anhydride with one mole of hydroxyethylacrylate) and mixed thoroughly. The above mixture is combined with 5 parts of trimethylolpropane triacrylate, 1 part of $\alpha,\alpha$-dimethoxy-$\alpha$-phenylacetophenone and 5 parts of benzophenone to give a uniform composition with a viscosity of 160 cps. A 3 mil draw down of the above composition was applied over steel substrate and cured with UV light having energy of 0.668 joules/cm$^2$. The UV cured film was hard and slippery with excellent adhesion to the substrate.

EXAMPLE 2

| Preparation of Liquid Polyaminoamide | |
|---|---|
| Charge: | |
| Dimerized fatty acid (EMPOL ® 1025[1]) | 580.6 gm(2.0 eq.) |
| Piperazine | 135.4 gm(3.2 eq.). |

[1]A trademark product of Cognis Corporation

Dimerized fatty acid and piperazine are added in a reaction kettle and heated to 227° C. for one hour and a vacuum of 15 mm Hg is applied for three hours to remove the water of reaction. A reaction carried out in this manner should produce a polyamide resin having an amine value of about 67 mg KOH/gm.

EXAMPLE 3

| Reaction of Polyamide with diacrylate of butanedioldiglycidylether | | |
|---|---|---|
| Charge | | |
| 1. | Butanediololdiglycidylether | 20.2 gm(0.2 eq.) |
| | Acrylic acid | 14.4 gm(0.2 eq.) |
| | Triphenylphosphine | 0.1 gm |
| | Hydroquinone monomethylether | 0.1 gm |
| 2. | Polyamide from Example 1 | 83.7 gm(0.1 eq.) |

Butanediol diglycidylether, triphenylphosphine and hydroquinone monomethyl ether is charged in a resin kettle and heated to 45° C. Acrylic acid is added over time by maintaining the reaction temperature below 80° C. The above reaction mixture is kept at 80–90° C. until the acid value is below 5 and all of the epoxide is reacted. The resulting diacrylate is cooled to 45° C. and added with charge 2. Once the exotherm is subsided, the reaction mixture is heated to 80° C. and kept at this temperature until all of the polyamide is reacted. A reaction carried out in this manner should produce a polyamide-acrylate resin that is a liquid at room temperature.

EXAMPLE 4

| Reaction of Polyamide with acrylic acid-methacrylic acid adduct of butanedioldiglycidylether | | |
|---|---|---|
| Charge | | |
| 1. | Butanedioldiglycidylether | 20.2 gm(0.2 eq.) |
| | Acrylic acid | 7.2 gm(0.1 eq.) |
| | Methacrylic acid | 8.4 gm(0.1 eq.) |
| | Triphenylphosphine | 0.1 gm |
| | Hydroquinone monomethylether | 0.1 gm |
| 2. | Polyamide from Example 1 | 83.7 gm(0.1 eq.) |

Charge 1 is added to the reaction kettle and reacted to produce the adducts of butanedioldiglycidylether containing both acrylate and methacrylate functionalities using conditions described in example 3. The above adduct is reacted with the Polyamide. A reaction carried out in this manner should produce a polyamide-methacrylate resin that is a liquid at room temperature.

EXAMPLE 5

| Reaction of Polyamide with GMA-Acrylic acid adduct | | |
|---|---|---|
| Charge: | | |
| 1. | Glycidylmethacrylate | 14.2 gm(0.1 eq.) |
| | Triphenyl phosphine | 0.1 gm |
| | Hydroquinone monomethylether | 0.1 gm |
| 2. | Acrylic acid | 7.2 gm(0.1 eq.) |
| 3. | Polyamide from Example 1 | 83.7 gm(0.1 eq.) |

Charge 1 is added to a reaction kettle and heated to 40–45° C. Charge 2 is added over time by keeping the reaction temperature below 80° C. due to exotherm. Reaction is continued at 80–90° C. until all of GMA is reacted. The resulting GMA-acrylic acid adduct is cooled to 40–50° C. and added with charge 3 over time by keeping the reaction mixture below 80° C. After the addition of charge 3, the reaction mixture is kept at 80–90° C. to complete the amine-acrylate addition reaction. A reaction carried out in this manner should produce a polyamide-acrylate resin that is a liquid at room temperature.

EXAMPLE 6

| Reaction of Polyamide with glycidyl methacrylate | |
|---|---|
| Charge: | |
| Glycidyl methacrye(GMA)[1] | 14.2 gm(0.1 eq.) |
| Polyamide from Example 1 | 83.7 gm(0.1 eq.) |
| Triphenylphosphine | 0.1 gm |
| Hydroquinone monomethylether | 0.1 gm |

Polyamide resin, triphenylphosphine and hydroquinone monomethylether are added in a reaction kettle and heated to 60° C. GMA is added to the kettle over time by keeping the temperature below 80° C. Reaction mixture is kept at 80° C. until all of the epoxide group from GMA is reacted. The resulting polyamide-methacrylate resin solution is cooled to 60° C. and poured out. A reaction carried out in this manner should produce a polyamide-methacrylate resin that is a liquid at room temperature.

EXAMPLE 7

| Reaction of Polyamide with monomethacrylate of butanedioldiglycidylether | | |
|---|---|---|
| Charge | | |
| 1. | Butanedioldiglycidylether | 20.2(0.2 eq.) |
| | Methacrylic acid | 8.4(0.1 eq.) |
| | Triphenylphosphine | 0.1 gm |
| | Hydroquinone monomethylether | 0.1 gm |
| 2. | Polyamide from Example 1 | 83.7 gm(0.1 eq.) |

Charge 1 is reacted using conditions as in example 5 to produce mono methacrylate of butanedioldiglycidylether. The monomethacrylate is reacted with the Polyamide. A reaction carried out in this manner should produce a polyamide-methacrylate resin that is a liquid at room temperature.

EXAMPLE 8

Reaction of Polyamide with urethane diacrylate

Charge

| | | |
|---|---|---|
| 1. | Isophorone diisocyanate[1] | 22.2. gm(0.2 eq.) |
| | Tone M-100[2] (hydroxy functional acrylate) | 68.8 gm(0.2 eq) |
| | Dibutytindilaurate | 0.1 gm |
| | Hydroquinone monomethylether | 0.1 gm |
| 2. | Polyamide from Example 1 | 83.7 gm(0.1 eq.) |

Urethane diacrylate is made by heating the charge 1 in a reaction kettle to 80° C. and holding the reaction mixture at that temp. until all of the isocyanates are reacted. The resulting product, urethane diacrylate is cooled to 60° C. and added and reacted with Polyamide. A reaction carried out in this manner should produce a polyamide-acrylate resin that is a liquid at room temperature.

EXAMPLE 9

Reaction of polyamide with isocyanate functional methacrylate monomer

Charge

| | | |
|---|---|---|
| 1. | Isophorone diisocyanate | 22.2 gm(0.2eq) |
| | Hydroxyethyl methacrylate | 13.0(0.1 eq.) |
| | Dibutyltindilaurate | 0.1 gm |
| | Hydroquinone monomethylether | 0.1 gm |
| 2. | Polyamide from Example 1 | 83.7 gm(0.1 eq.) |

First half of the isocyanate in Isophorone diisocyanate is reacted with hydroxyethyl methacrylate using conditions described in Example 8. The resulting isocyanate functional urethane methacrylate is reacted with Polyamide to produce polyamide-methacrylate resin.

EXAMPLE 10

A polyamide resin is prepared in a resin kettle from a mixture of 81.09% by weight EMPOL® 1025 Dimer Acid (hydrogenated dimerized fatty acid mixture available from Cognis Corporation), and 18.91% by weight piperazine. The mixture was refluxed for one hour before heating to 227° C. (440° F.) while collecting distillate. Material was held at 227° C. for one hour under nitrogen flow and then three hours at the same temperature under a vacuum of 15 mm Hg. The resulting product was a viscous liquid with an Mn value of 1570 and a Mw value of 3660. The product titrated with HCl to bromocresol green end-point to show an amine value of 67 mg KOH/gram

EXAMPLE 11

A polyamide resin is prepared in a resin kettle from a mixture of 78.65% by weight EMPOL® 1025 Dimer Acid (hydrogenated dimerized fatty acid mixture available from Cognis Corporation), 12.18% 1,2-cyclohexanediamine, and 9.17% by weight piperazine. The mixture was refluxed for one hour before heating to 227° C. (440° F.) while collecting distillate. Material was held at 227° C. for one hour under nitrogen flow and then three hours at the same temperature under a vacuum of 15 mm Hg. The resulting product was a viscous liquid. The product titrated with HCl to bromocresol green end-point to show an amine value of 56 mg KOH/gram.

EXAMPLE 12

A polyamide resin is prepared in a resin kettle from a mixture of 82.88% by weight EMPOL® 1061 (distilled dimerized fatty acid mixture available from Cognis Corporation), 5.46% ethylenediamine, and 11.66% by weight piperazine. The mixture was refluxed for one hour before heating to 227° C. (440° F.) while collecting distillate. Material was held at 227° C. for one hour under nitrogen flow and then three hours at the same temperature under a vacuum of 15 mm Hg. The resulting product was a slightly tacky solid. The product titrated with HCl to bromocresol green end-point to show an amine value of 49.2 mg KOH/gram. The amid-amine resin had an Mn of 1930 and an Mw of 4030 by GPC. A solution was prepared containing 50% resin solids, 1% water, and 49% 2-propanol.

EXAMPLE 13

A polyamide resin is prepared in a resin kettle from a mixture of 76.02% by weight EMPOL® 1061 Dimer Acid (distilled dimerized fatty acid mixture available from Cognis Corporation), 7.62% ethylenediamine, and 16.36% by weight aminoethyl-piperazine. The mixture was refluxed for one hour before heating to 227° C. (440° F.) while collecting distillate. Material was held at 227° C. for one hour under nitrogen flow and then three hours at the same temperature under a vacuum of 15 mm Hg. The resulting product was a slightly tacky solid. The product titrated with HCl to bromocresol green end-point to show an amine value of 112 mg KOH/gram. The amido-amine resin had an Mn of 1410 and an Mw of 2000 by GPC. A solution was prepared containing 64.3% resin solids and 35.7% 2-propanol.

EXAMPLE 14

A polyamide resin is prepared in a resin kettle from a mixture of 63.88% by weight EMPOL® 1061 (distilled dimerized fatty acid mixture available from Cognis Corporation) and 36.12% by weight isophorone diamine. The mixture was refluxed for one hour before heating to 227° C. (440° F.) while collecting distillate. Material was held at 227° C. for one hour under nitrogen flow and then three hours at the same temperature under a vacuum of 15 mm Hg. The resulting product was an amber solid. The product titrated with HCl to bromocresol green end-point to show an amine value of 79.2 mg KOH/gram. The amido-amine resin had an Mn of 1770 and an Mw of 2680 by GPC. A solution was prepared containing 74% resin.

EXAMPLE 15

81.6 grams of resin/2-propanol solution from example 14 was mixed with 7.99 grams maleic anhydride and 12.75 grams toluene. The product titrated with HCl to bromocresol green end-point to show an amine value of <0.2 mg KOH/gram. The resin solution was titrated with ethanolic KOH to a phenophthalein end-point to show an acid value of 68.2 mg KOH/gram based on resin solids. The resulting maleic amide-acid terminated resin had an Mn of 1700 and an Mw of 2770 by GPC.

EXAMPLE 16

81.6 grams of resin/2-propanol solution from example 14 was mixed with 7.99 grams maleic anhydride and 12.75 grams toluene. The product titrated with HCl to bromocresol green end-point to show an amine value of <0.2 mg KOH/gram. The resin solution was titrated with ethanolic KOH to a phenophthalein end-point to show an acid value of 68.2 mg KOH/gram. The resulting maleic amide-acid terminated resin had an Mn of 1700 and an Mw of 2770 by GPC.

EXAMPLE 17

92.74 grams of viscous liquid resin from Example 11 was dissolved in 30 grams toluene and then mixed with 9.05 grams maleic anhydride.

EXAMPLE 18

73.92 grams of resin/2-propanol solution from Example 13 was mixed with 16.35 grams glycidyl methacrylate (from Dow Chemical Co). The resin solution was heated to 50° C. for 5 hours.

EXAMPLE 19

99.84 grams of resin/2-propanol solution from Example 14 was mixed with 18.25 grams glycidyl methacrylate (from Dow Chemical Co). The resin solution was heated to 50° C. for 5 hours.

EXAMPLE 20

81.79 grams of resin/2-propanol solution from Example 12 was mixed with 5.10 grams glycidyl methacrylate (from Dow Chemical Co). The resin solution was heated to 50° C. for 5 hours.

EXAMPLE 21

106.56 grams of viscous liquid resin from Example 11 was dissolved in 30.50 grams toluene and then mixed with 15.10 grams glycidyl methacrylate (from Dow Chemical Co). The resin solution was heated to 50° C. for 5 hours.

What is claimed is:

1. A liquid radiation-curable composition comprising the reaction product of an amine-terminated (poly)aminoamide and a mono-(meth)acrylate or a poly-(meth)acrylate.

2. The composition of claim 1 wherein the polyaminoamide is the reaction product of a $C_{36}$ dimer acid and triethylene tetramine.

3. The composition of claim 1 wherein the poly-(meth)acrylate is the diacrylate ester of butanedioldiglycidyl ether.

4. The composition of claim 1 wherein the poly-(meth)acrylate is an acrylate-methacrylate ester of butanedioldiglycidyl ether.

5. The composition of claim 1 wherein the poly-(meth)acrylate is the reaction product of acrylic acid and glycidylmethacrylate.

6. The composition of claim 1 wherein the mono-(meth)acrylate is glycidylmethacrylate.

7. The composition of claim 1 wherein the mono-(meth)acrylate is the monomethacrylate of butanedioldiglycidyl ether.

8. The composition of claim 1 wherein the poly-(meth)acrylate is a (meth)acrylate-terminated urethane.

9. The composition of claim 1 further comprising an acid functional (meth)acrylate.

10. The composition of claim 9 wherein the acid functional (meth)acrylate is the reaction product of a dicarboxylic acid anhydride and acrylic or methacrylic acid.

11. A composition comprised of a substrate and a composition of claim 1.

12. The composition of claim 11 wherein the substrate is selected from the group consisting of glass, plastic, metal, wood, paper and leather.

13. The composition of claim 1 wherein the mono- or poly-(meth)acaylate and amine-terminated (poly)aminoamide are reacted in a (meth)aorylate equivalence to amine hydrogen equivalence ratio of from about 100 to about 1.

14. The composition of claim 1 wherein the mono- or poly-(meth)acrylate and amine-terminated (poly)aminoamide are reacted in a (meth)acrylate equivalence to amine hydrogen equivalence ratio of from about 15 to about 1.

15. The composition of claim 1 wherein the mono- or poly-(meth)acrylate and amine-terminated (poly)aminoamide are reacted in a (meth)acrylate equivalence to amine hydrogen equivalence ratio of from about 8 to about 1.

* * * * *